United States Patent
Borufka et al.

(10) Patent No.: US 8,821,122 B2
(45) Date of Patent: Sep. 2, 2014

(54) INTEGRALLY BLADED ROTOR DISK FOR A TURBINE

(75) Inventors: Hans-Peter Borufka, Starnberg (DE); Frank Stiehler, Bad Liebenwerda (DE); Hernan Victor Arrieta, Rzeszow (PL); Patrick Prokopczuk, Munich (DE); Joachim Lorenz, Altomuenster (DE)

(73) Assignee: MTU Aero Engines GmbH, Munich (DE)

( * ) Notice: Subject to any disclaimer, the term of this patent is extended or adjusted under 35 U.S.C. 154(b) by 595 days.

(21) Appl. No.: 13/141,544

(22) PCT Filed: Feb. 1, 2010

(86) PCT No.: PCT/DE2010/000107
§ 371 (c)(1),
(2), (4) Date: Jun. 22, 2011

(87) PCT Pub. No.: WO2010/088882
PCT Pub. Date: Aug. 12, 2010

(65) Prior Publication Data
US 2011/0255991 A1 Oct. 20, 2011

(30) Foreign Application Priority Data
Feb. 4, 2009 (DE) .......................... 10 2009 007 468

(51) Int. Cl.
*F01D 5/18* (2006.01)
*F01D 5/34* (2006.01)
(52) U.S. Cl.
CPC ................. *F01D 5/34* (2013.01); *Y02T 50/676* (2013.01); *F04D 5/082* (2013.01)
USPC ................. 416/97 R; 416/210 R; 416/213 R; 416/234; 416/239; 416/248; 415/115; 415/116

(58) Field of Classification Search
CPC ....... F01D 5/082; F01D 5/181; F01D 5/3069; F01D 5/34; F01D 11/006
USPC ........... 416/96 R, 97 R, 204 R, 210 R, 213 R, 416/204 A, 234, 239, 248; 415/115, 116
See application file for complete search history.

(56) References Cited

U.S. PATENT DOCUMENTS

| | | | | |
|---|---|---|---|---|
| 3,656,865 A | * | 4/1972 | Spears, Jr. ...................... | 416/221 |
| 3,778,188 A | | 12/1973 | Aspinwall ........................ | 416/97 |
| 3,847,506 A | | 11/1974 | Straniti ........................ | 416/244 |
| 4,047,837 A | | 9/1977 | Hueber et al. .................. | 416/95 |
| 4,813,848 A | | 3/1989 | Novotny ........................ | 416/95 |
| 5,173,024 A | * | 12/1992 | Mouchel et al. ........... | 416/220 R |
| 5,244,345 A | * | 9/1993 | Curtis ............................ | 416/95 |
| 5,281,098 A | * | 1/1994 | Glynn et al. .................. | 416/221 |
| 6,022,190 A | * | 2/2000 | Schillinger ................ | 416/96 R |
| 2005/0232780 A1 | | 10/2005 | Newman ........................ | 416/234 |
| 2008/0298972 A1 | | 12/2008 | Le Hong ...................... | 416/219 R |

FOREIGN PATENT DOCUMENTS

| | | |
|---|---|---|
| DE | 103 61 882 A1 | 7/2005 |
| EP | 0144842 | 6/1985 |
| EP | 1950381 | 7/2008 |
| GB | 947553 | 1/1964 |
| GB | 2251897 | 7/1992 |

* cited by examiner

*Primary Examiner* — Igor Kershteyn
(74) *Attorney, Agent, or Firm* — Davidson, Davidson & Kappel, LLC

(57) ABSTRACT

An integrally bladed rotor disk (20) for a turbine, including rotor blades (40), which are joined in a substance-to-substance bond to a disk element (30), and a sealing device (60) for preventing or reducing the extent to which cooling air is able to flow from a high-pressure side (12) of the rotor disk (20) through openings (24) on the rotor disk (20) to a low-pressure side (14) of the rotor disk (20).

12 Claims, 6 Drawing Sheets

INTEGRALLY BLADED ROTOR DISK FOR A TURBINE

The present invention relates to an integrally bladed rotor disk (blisk=bladed disk) for a turbine, in particular for a high-pressure section of a turbine, as well as to a turbine.

BACKGROUND

Due to thermodynamics, the efficiency of an internal combustion engine increases with the combustion temperature. Therefore, for gas turbines used in numerous variants in aircraft, but also in other vehicles and in stationary applications, one aspires to ever higher temperatures in the combustion chamber(s). In the high-pressure section of the turbine directly downstream of the combustion chamber(s), all open surfaces of guide vanes and rotor blades and other exposed components are subject to these high temperatures. To be able to operate a turbine at a highest possible temperature, the components, in particular the blades, which are exposed to the hot gas stream, are cooled by interior cooling channels and by a film cooling.

Integrally bladed rotor disks have been developed for compressors that are coupled upstream of the combustion chamber and are, therefore, not subject to the hot combustion temperatures. Since a number of disadvantages are entailed in manufacturing an integrally bladed rotor disk from one piece, the rotor blades are normally manufactured individually and then joined in an integral metallurgical bond to a disk element by friction welding or some other method. The U.S. Patent Application 2005/0232780 A1 describes an integrally bladed rotor disk for a turbine, where entry orifices of the inner cooling channels are each configured on the shaft of a blade. Platforms configured in each case between the shaft and the blade can be welded to one another circumferentially. Alternatively, seal strips are configured between mutually opposing platform edges.

The rotor disk described in U.S. Patent Application 2005/0232780 A1 has the inherent disadvantage that cooling air can flow through between the shafts of the rotor blades, from the high-pressure side to the low-pressure side of the rotor disk. Due to reasons related to production engineering, in certain manufacturing processes, it is not possible or not easily possible to have circumferentially measured spacing intervals between the shafts whose widths are below a minimum value. Since power is required to compress cooling air in the compressor that is then supplied to the turbine, every unwanted outflow of cooling air negatively affects power efficiency and is, therefore, to be avoided to the extent possible.

SUMMARY OF THE INVENTION

It is an object of the present invention to provide an improved, integrally bladed rotor disk, a finger cover plate, as well as a turbine having an integrally bladed rotor disk.

The present invention provides an integrally bladed rotor disk and a turbine in accordance with the independent claims. Further refinements are defined in the dependent claims.

The present invention is based on the idea of creating a sealing device on an integrally bladed rotor disk for a turbine in order to prevent or reduce the extent to which cooling air is able to flow from a high-pressure side of the rotor disk through openings to a low-pressure side. This sealing device may partially or completely seal, in particular, annularly configured openings between shafts of adjacent rotor blades in each case. Thus, it is possible to prevent or reduce the extent to which cooling air is able to flow from the high-pressure side to the low-pressure side of the rotor disk, even in the case of shafts having a substantial length measured in the radial direction and/or a substantial spacing therebetween measured circumferentially.

The present invention creates additional degrees of design freedom, thereby making it possible to further optimize the integrally bladed rotor disk and the manufacturing thereof. For example, the shafts may have a narrower design, thereby improving an inflow of cooling air to the entry orifices of inner cooling channels that are configured at the sides of the shafts.

The sealing device includes, for example, a single- or multi-part annular or circular component. When this component seals the openings at the low-pressure side of the rotor disk, cooling air is able to flow unimpeded from the high-pressure side into entry orifices of cooling channels in the rotor blades, not, however, to the low-pressure side of the rotor disk. If the sealing device is configured at the high-pressure side of the rotor disk, it may be advantageous for openings to be arranged in the sealing device to allow the cooling air to reach the shafts of the rotor blades and, as the case may be, entry orifices of the inner cooling channels on the shafts.

The annular component is made, for example, of one or of a plurality of sheet-metal parts that are joined together by a substance-to-substance bond, form-locking engagement or in some other manner. The annular component may be hooked into retaining elements on the rotor disk or be retained by holding devices which, on the one hand, engage into the openings and, on the other hand, hold the annular component. Suited as such holding devices are, for example, pipes or profiled sheet-metal components that are configured in the openings and that retain the annular component by form-locking engagement on the rotor disk by collars or raised edges at both of the ends thereof.

To adjust the mass flow required for cooling the rotor disk, openings may be provided in the sealing device whose hydraulic cross-sectional areas determine the cooling mass flow. As already mentioned, most notably in the case of a configuration of the sealing device on the low-pressure side of the rotor disk, cooling air may enter from the high-pressure side into entry orifices of the inner cooling channels that are configured in the shafts of the rotor blades. The entry orifices of the cooling channels may be configured at the surfaces of the shafts facing the high-pressure side and/or at the lateral surfaces of the shafts assigned to the adjacent shafts in the particular case and/or at the surfaces of the shafts facing the low-pressure side. A supplying of cooling air to the cooling channels via a cover plate, a finger cover plate or a pre-swirl nozzle is especially advantageous when the entry orifices of the cooling channels oppose such a device, thus, in particular, are configured at the sides of the shafts facing the high-pressure side.

The present invention is also based on the idea of providing a finger cover plate for directing cooling air to the rotor blades of an integrally bladed rotor disk. At the outer periphery thereof, the finger cover plate has finger-like radial protuberances and radial notches therebetween. The distance to the outer peripheral edge of the finger cover plate from the midpoint thereof is thereby greater at the finger-shaped radial protuberances than at the radial notches.

In the context of an integrally bladed rotor disk for a turbine, it is also an underlying idea of the present invention to configure entry orifices to the cooling channels at the sides of the rotor blades or the shafts thereof that face a high-pressure side of the rotor disk and/or a low-pressure side of the rotor disk.

In the context of platforms that are not welded together, it is also an underlying idea of the present invention to configure sealing devices between the shafts of the rotor blades and in such a way that they adjoin the platforms, in particular, radially inwardly. These sealing devices make it possible to prevent or reduce a gas stream in the radial direction in between the platforms of adjacent rotor blades. It is especially possible to prevent or reduce a flowing of cooling air from the openings or interspaces between the shafts of the rotor blades radially outwardly to the blades, as well as an entry of hot gases radially inwardly. Since the sealing devices are configured between the shafts and in such a way that they adjoin the platforms, little complexity is entailed in inserting the same following connection of the rotor blades to the central disk element. The sealing action may be reinforced by the centrifugal forces acting during operation of the turbine that press the sealing devices against the platforms. It is possible to advantageously combine the above described sealing device for sealing the openings between the shafts of the rotor blades against a mass flow in the axial direction with the last-described sealing devices for sealing against a mass flow in the radial direction. It is thus possible to provide an almost complete control of the cooling air streams that would otherwise only be possible if the rotor disk were completely enclosed within the platform(s). For this purpose, other sealing devices may also be used for sealing in the radial direction.

Overall, therefore, in its various forms and specific embodiments, the present invention makes possible an improved control of the cooling air stream and less loss of cooling air. It is thus possible to realize a reduced cooling air requirement and/or an improved cooling of the rotor disk, including the central disk element and the rotor blades. The present invention is suited for turbines, in particular for extreme temperature-exposed high-pressure turbines or high-pressure components of turbines, in jet engines, turbofan engines, turboprop engines, turboshaft engines and other engines of airplanes or other vehicles, as well as in stationary applications.

BRIEF DESCRIPTION OF THE DRAWINGS

Exemplary embodiments are explained in the following with reference to the enclosed figures, which show.

DETAILED DESCRIPTION

Figure 1:
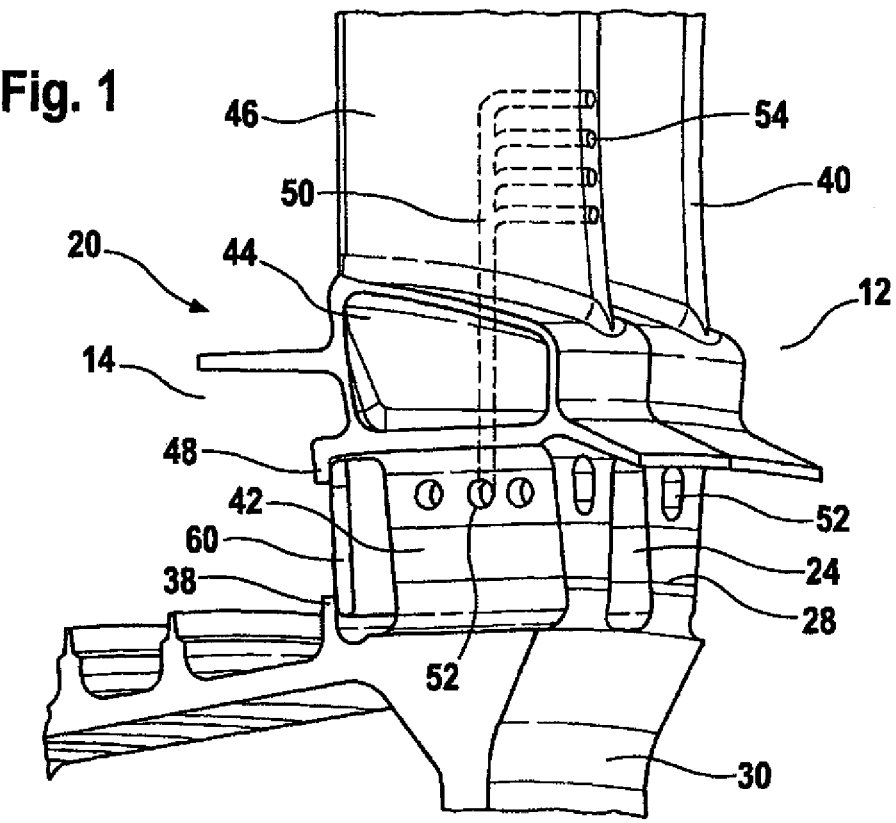
FIG. 1 a schematic representation of an integrally bladed rotor disk.
Figure 11:
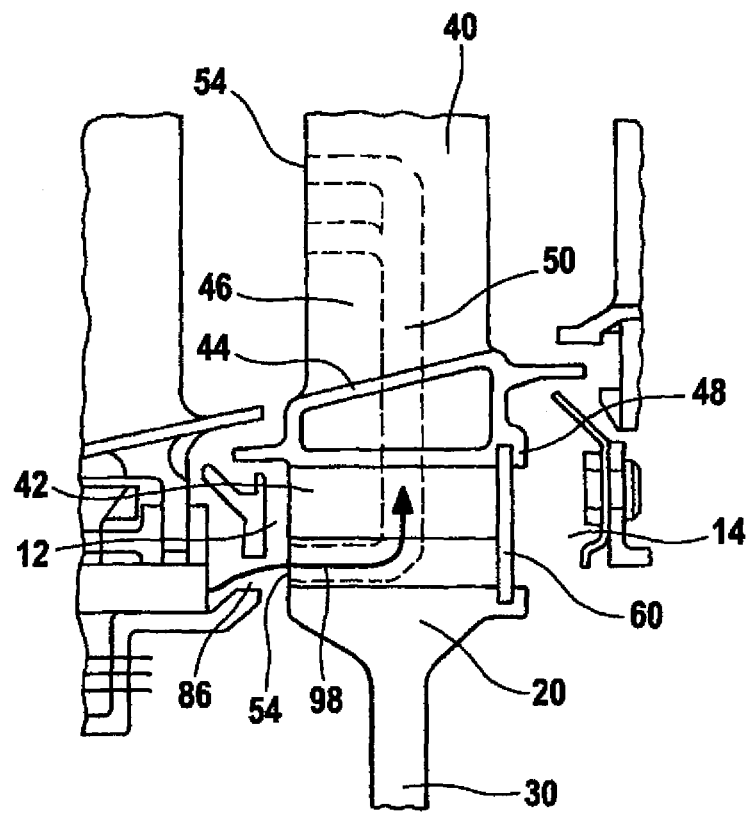
FIG. 11 a schematic representation of another integrally bladed rotor disk.

The figures described in the following show schematic representations of various specific embodiments of integrally bladed rotor disks. In each case, only one section of the rotor disk is shown, namely a radially outer region of a section of a disk element, to whose outer periphery, rotor blade shafts of a rotor blade ring are joined in a substance-to-substance bond. The rotor blades, in particular the blades thereof, are also only partially shown. Some of the figures show cylinders that are attached to the actual rotor disks and may be formed in one piece therewith, but are not discussed in greater detail in the following. FIG. 1 through 7 and 9 show perspective representations; FIGS. 8 and 11 show sections along a plane that includes the axis of the rotor disk. FIG. 1 shows an integrally bladed rotor disk 20 having a disk element 30 that is joined in a substance-to-substance bond in an outer region to rotor blades 40. Each rotor blade has a shaft 42, a platform 44 and a blade 46. The radially inner ends of shafts 42 are each joined at a join 28 in a substance-to-substance bond, for example by friction welding, to the outer periphery of disk element 30. Viewed circumferentially, platforms 44 of rotor blades 40 feature a small mutual spacing, adjoin one another, are welded to one another or are joined in some other manner. The width of a shaft 42 measured circumferentially is smaller or significantly smaller than the width of a platform 44. Therefore, interspaces, respectively openings 24 remain between shafts 42 that, apart from the measures described in the following, allow flow communication from a high-pressure side 12 to a low-pressure side 14 of integrally bladed rotor disk 20 in the axial direction.

Configured in each rotor blade 40 is/are one or a plurality of cooling channels 50 which lead(s) from entry orifices 52 in shaft 42 of the rotor blades to outlets 54 in blade 46 of rotor blades 40. Entry orifices 52 are each configured on a side of shaft 42 facing high-pressure side 12 and/or on a side of shaft 42 facing low-pressure side 14, and/or on one or both sides of shaft 42 facing the adjacent rotor blades in each case. In the illustrated example, outlets 54 are configured at an edge of blade 46 facing high-pressure side 12 of rotor disk 20. Alternatively or additionally, outlets 54 may be configured at the surfaces of blade 46 facing adjacent rotor blades 40.

A component 60, which is annular in this example, is configured at low-pressure side 14 upstream of openings 24. Annular component 60 is retained by hooks or ribs 38, 48 on disk element 30 and on rotor blades 40. Hooks 48 on rotor blades 40 are configured on low-pressure side 14 in a radially inner region of platforms 44. Annular component 60 is a sealing device which, together with hooks 38, 48 on disk element 30 and on rotor blades 40, prevents or reduces the extent to which cooling air flows from high-pressure side 12 through openings 24 to low-pressure side 14. Annular component 60 is made, for example, of a one-piece, annular sheet-metal strip. Alternatively, annular component 60 is composed of a plurality of sheet-metal parts or other parts that are joined to one another in a substance-to-substance bond, in form-locking engagement, in force-locking engagement or in some other manner.

Figure 2:
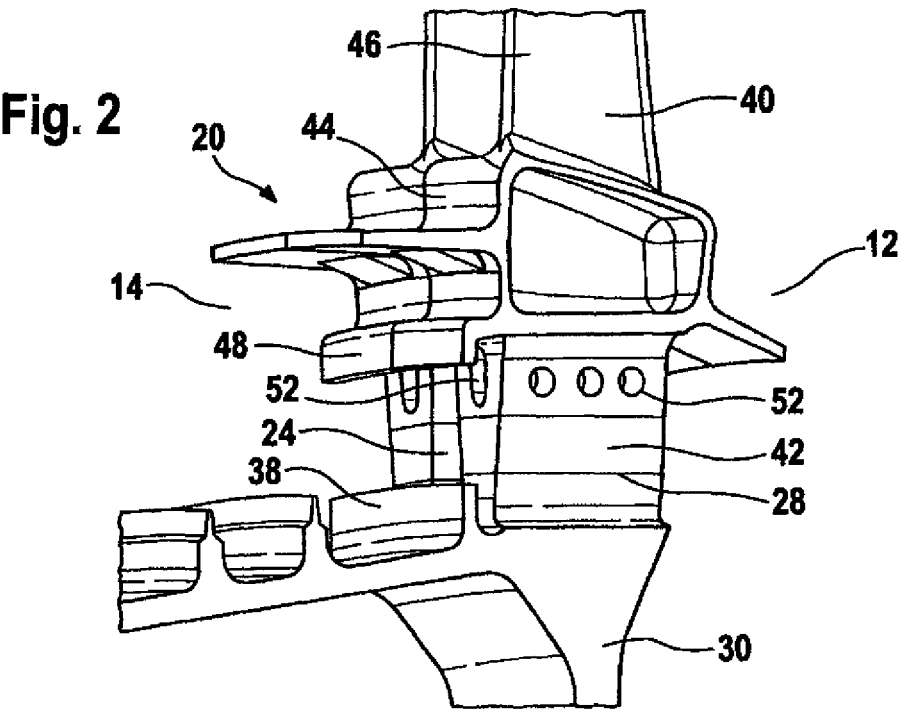
FIG. 2 another schematic representation of the integrally bladed rotor disk from FIG. 1.

FIG. 2 shows a schematic representation of integrally bladed rotor disk 20, which is shown with reference to FIG. 1 from another perspective. Annular component 60 is omitted in FIG. 2 in order to illustrate the sides of shafts 42 facing low-pressure side 14 and entry orifices 52 configured there. Deviating from the representations in FIGS. 1 and 2, entry orifices 52 to cooling channels 50 may be configured in fewer than all sides of shafts 42, for example only at the side facing high-pressure side 12 and/or at the side facing low-pressure side 14.

Figure 3:
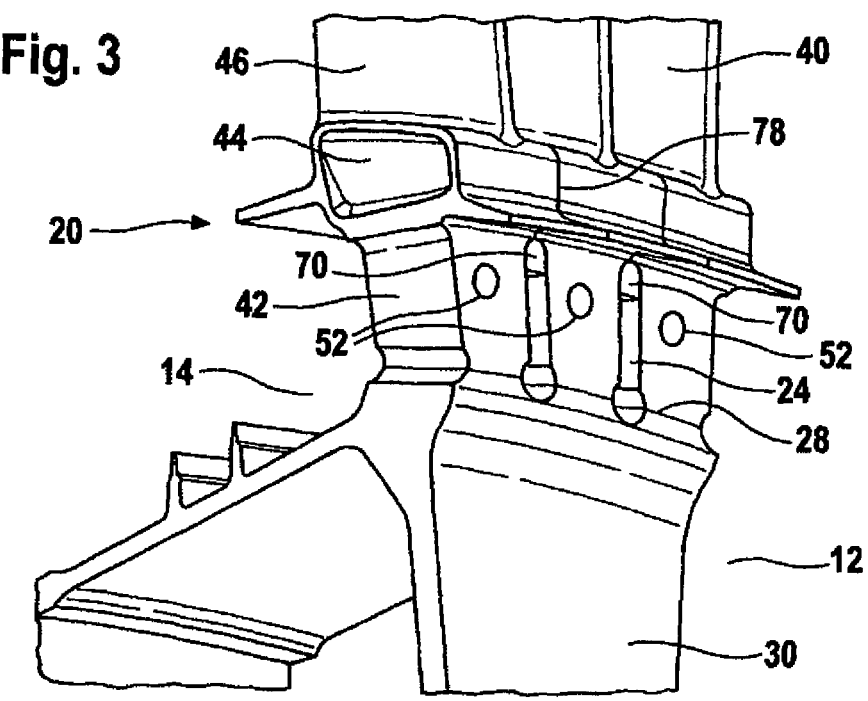
FIG. 3 a schematic representation of another integrally bladed rotor disk.

FIG. 3 shows a schematic representation of integrally bladed rotor disk 20, which differs in several points from the description provided above with reference to FIGS. 1 and 2.

In particular, shaft 42 of each rotor blade 40 has only one entry orifice 52 to an inner cooling channel not shown in FIG. 3. This entry orifice 52 is configured on each side of shaft 42 facing high-pressure side 12. In addition, another entry orifice may be configured on the side of shaft 42 facing low-pressure side 14.

In addition, integrally bladed rotor disk 20 shown in FIG. 3 differs from that illustrated with reference to FIGS. 1 and 2 in that sealing devices 70 are configured in the interspaces, respectively openings 24 between shafts 42 of rotor blades 40. Sealing devices 70 are configured in the immediate vicinity of platforms 44 or adjoin the same radially inwardly. By engaging on shafts 42 and/or on platforms 44, sealing devices 70 seal the interspaces, respectively openings between shafts 42 against a gas exchange in the radial direction. Without sealing devices 70, cooling air could escape through openings 24 radially outwardly between platforms 44. Depending on the pressure conditions, hot gases could also enter radially inwardly, between platforms 44, into openings 24. In FIG. 3, radial lines 78 denote the radially outwardly extending gaps that are located between platforms 44 and are sealed by sealing devices 70.

A component, which in this example is annular, for sealing openings 24 against a gas exchange in the axial direction between high-pressure side 12 and low-pressure side 14, or another sealing device having an equivalent function is not shown in FIG. 3, but may be advantageously combined with sealing devices 70.

Figure 4:
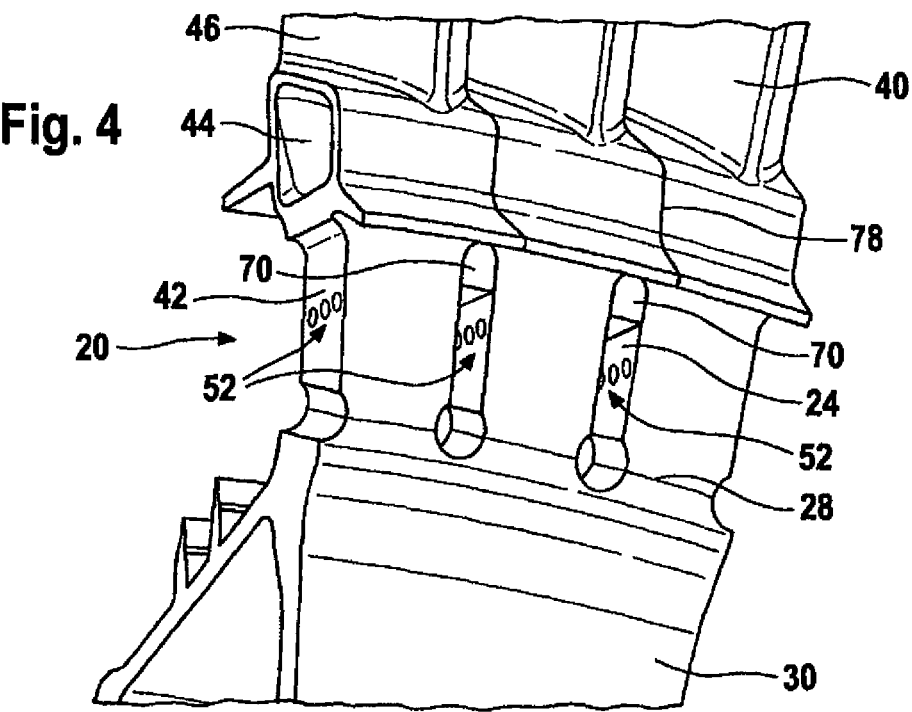
FIG. 4 a schematic representation of another integrally bladed rotor disk.

FIG. 4 shows a schematic representation of another integrally bladed rotor disk 20, which differs from the description provided above with reference to FIG. 3 in that no entry orifices are provided for inner cooling channels of rotor blades 40 at the sides of shafts 42 facing low-pressure side 14. Instead, at least one side facing a shaft 42 of an adjacent rotor blade 40, shaft 42 of each rotor blade 40 has one or a plurality of entry orifices 52 to inner cooling channels, which again are not shown in FIG. 4. Sealing devices 70 shown in FIG. 4 correspond to those described above with reference to FIG. 3.

Figure 5:
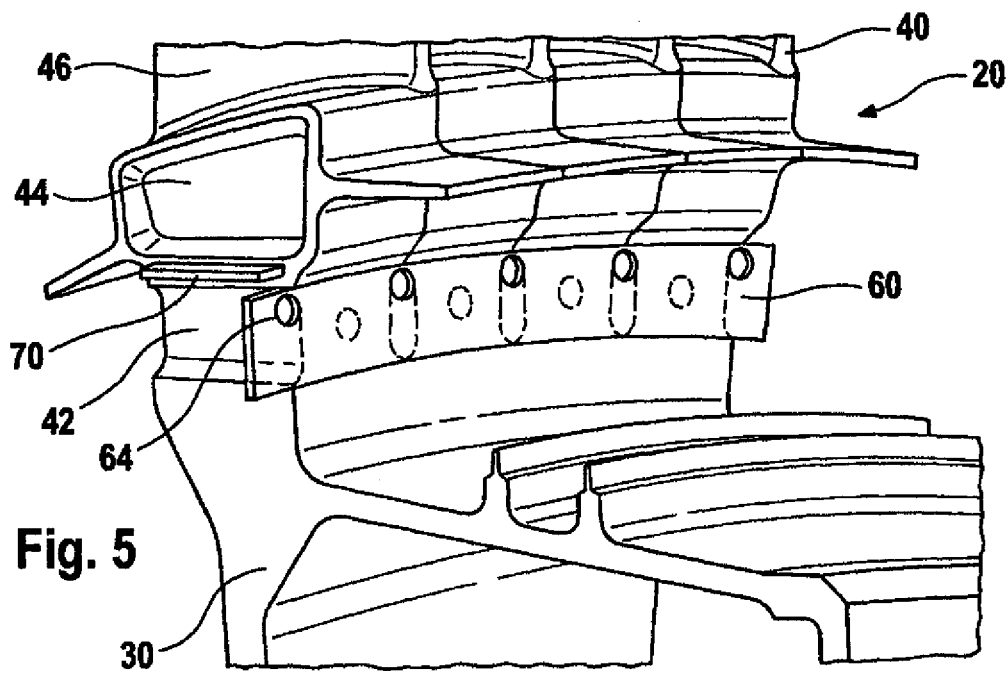
FIG. 5 a schematic representation of another integrally bladed rotor disk.

FIG. 5 shows a schematic representation of an integrally bladed rotor disk 20. Similarly to the integrally bladed rotor disks illustrated above with reference to FIG. 1 through 4, it has a disk element 30 to whose outer region, the radially inner ends of shafts 42 of rotor blades 40 are joined in a substance-to-substance bond. Platforms of rotor blades 40 that are configured between shafts 42 and blades 46 adjoin one another circumferentially or feature only a small mutual spacing. The width of a shaft 42 measured circumferentially is smaller or significantly smaller than the width of a platform 44, so that openings remain between shafts 42 that allow flow communication from the high-pressure side to the low-pressure side of integrally bladed rotor disk 20. A component 60, which in this example is annular, seals these openings to a considerable degree. Annular component 60 itself has openings 64 having a substantially smaller cross section. In contrast to the integrally bladed rotor disk illustrated with reference to FIGS. 1 and 2, as a sealing device, annular component 60 does not completely prevent a mass flow from the high-pressure side through the openings between shafts 42 to the low-pressure side, but rather limits it only to an amount that is determined by openings 64.

Sealing devices 70 are configured between platforms 44. Each sealing device 70 has an elongated rectangular shape, for example, and is held and guided in a pocket-shaped slot in the two adjoining platforms 44. Similarly to the sealing devices illustrated above with reference to FIGS. 3 and 4, sealing devices 70 prevent or reduce an exchange of gas in the radial direction between platforms 44.

FIG. 5 does not show the fastening of annular component 60. As illustrated above with reference to FIGS. 1 and 2, for example, annular component 60 may be hooked into disk element 30 and rotor blades 40 or fastened in some other way. Annular component 60 may, however, also be joined to integrally bladed rotor disk 20 or connected thereto in a different manner. In this context, annular component 60 may be fabricated in one piece or encompass a plurality of initially separately manufactured or produced parts that are joined to one another by a substance-to-substance bond, form-locking engagement or in some other manner.

Instead of sealing devices 70 between platforms 44 of rotor blades 40, sealing devices may be provided, as described further above with reference to FIGS. 3 and 4. Similarly to the description provided above with reference to FIG. 1 through 4, rotor blades 40 of integrally bladed rotor disk 20 illustrated in FIG. 5 may also have cooling channels.

Figure 6:
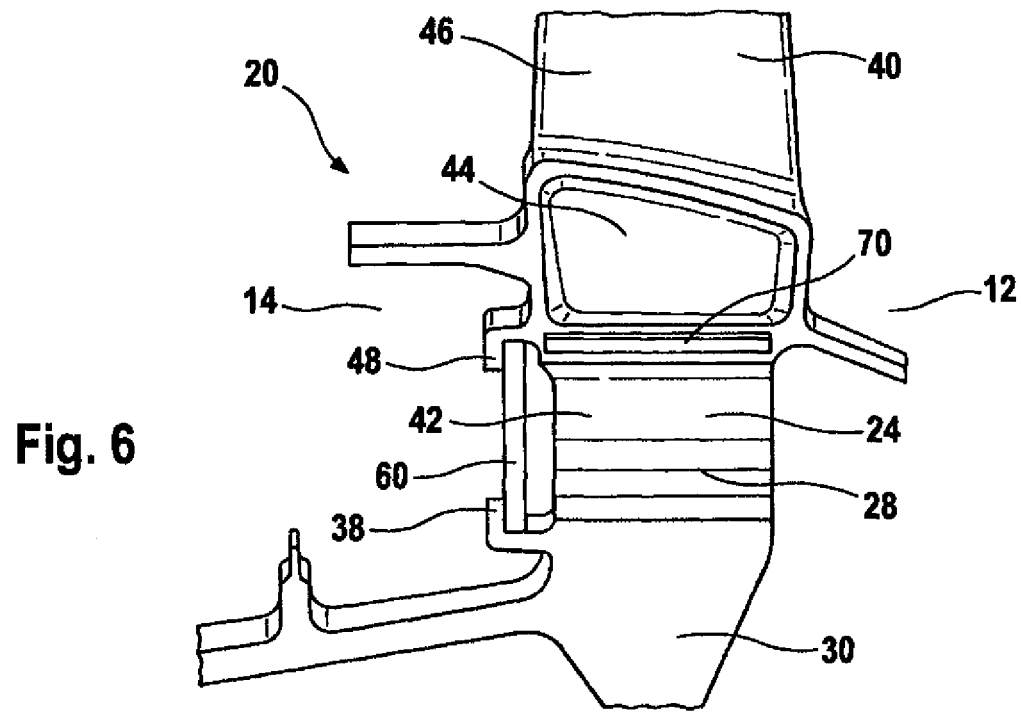
FIG. 6 a schematic representation of another integrally bladed rotor disk.

FIG. 6 shows a schematic representation of an integrally bladed rotor disk 20. Similarly to the rotor disks described above with reference to FIG. 1 through 5, radially inner ends of shafts of rotor blades 40 are joined in a substance-to-substance bond to an outer periphery of a disk element 30. Platforms 44 are configured between shafts 42 and blades 46 of rotor blades 40. Gaps or spaces configured circumferentially between platforms 44 are substantially sealed by sealing devices 70, similarly to the description provided above with reference to FIG. 5, against an exchange of gas in the radial direction.

Disposed between shafts 42 are openings 24 which allow flow communication from a high-pressure side 12 to a low-pressure side 14 of integrally bladed rotor disk 20. A component 60, which in this example is annular, is held by hooks 38, 48 on disk element 30 and on rotor blades 40. Annular component 60 is a sealing device which prevents or reduces the flow of cooling air in the axial direction from high-pressure side 12 through openings 24 to low-pressure side 14.

Figure 7:
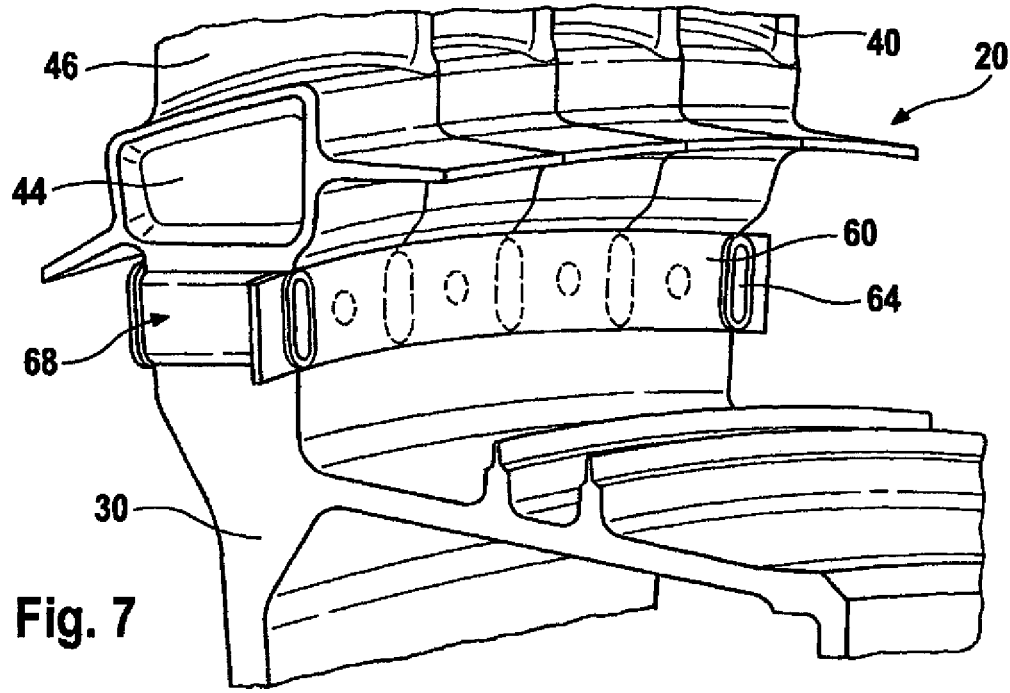
FIG. 7 a schematic representation of another integrally bladed rotor disk.
Figure 8:
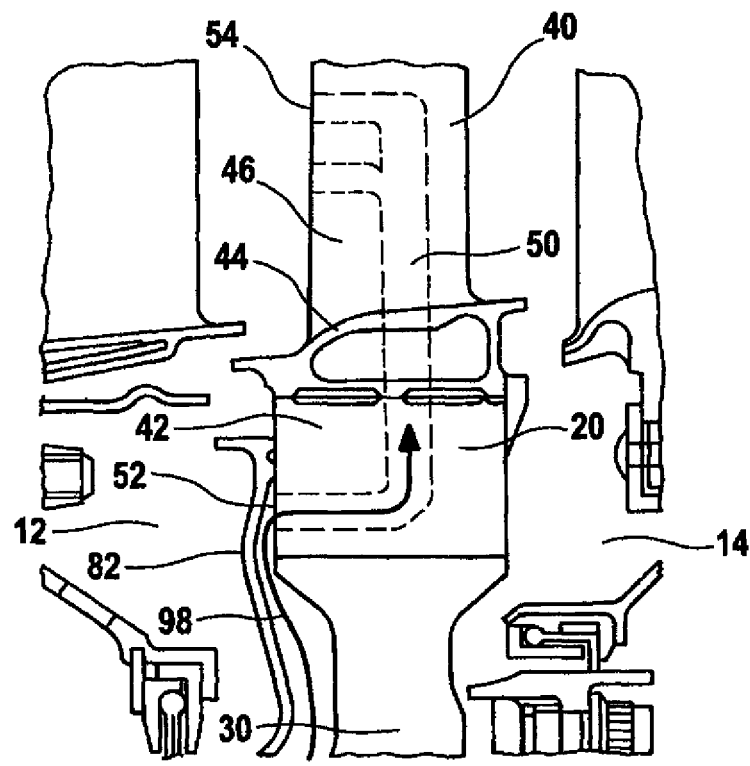
FIG. 8 a schematic representation of another integrally bladed rotor disk.

FIG. 7 shows a schematic representation of an integrally bladed rotor disk 20. Similarly to the integrally bladed rotor disks described above with reference to FIG. 1 through 6, an outer region of a disk element 30 is joined in a substance-to-substance bond to the radially inner ends of shafts of rotor blades 40 merely indicated in FIG. 7. Configured between these shafts are openings that are likewise only indicated in FIG. 7. These openings, which allow flow communication from the high-pressure side to the low-pressure side of integrally bladed rotor disk 20, are sealed to a considerable degree by a component 60 that is annular in this example.

In some of the openings between the shafts, pipes 68 are configured as holding devices for annular component 60. On the high-pressure side, such a pipe 68 has a collar that acts as a mechanical stop and prevents a movement of pipe 68 through the opening to the low-pressure side of rotor disk 20. On the low-pressure side, each pipe projects through a corresponding opening in annular component 60. An outwardly crimped-over rim of pipe 68 holds annular component 60 on pipe 68 and thus on integrally bladed rotor disk 20. The lumen of each pipe 68 forms an opening 64 which connects the high-pressure side to the low-pressure side of integrally bladed rotor disk 20. Alternatively, the lumina of pipes 68 are closed.

Similarly to the integrally bladed rotor disks described above with reference to FIGS. 1, 2, 5 and 6, annular component 60 is fabricated in one piece, for example as a sheet-metal ring, or is composed of a plurality of parts, for example sheet-metal parts, in a substance-to-substance bond, in form-locking engagement, or in some other manner. For example, annular component 60 is composed of individual circular arc-shaped segments, which are not joined directly to one another and whose two peripheral ends are each held by a pipe 68.

In place of pipes 68, shaped components or other holding devices may engage into the openings between the shafts of rotor blades 40 and hold annular component 60.

Figure 9:
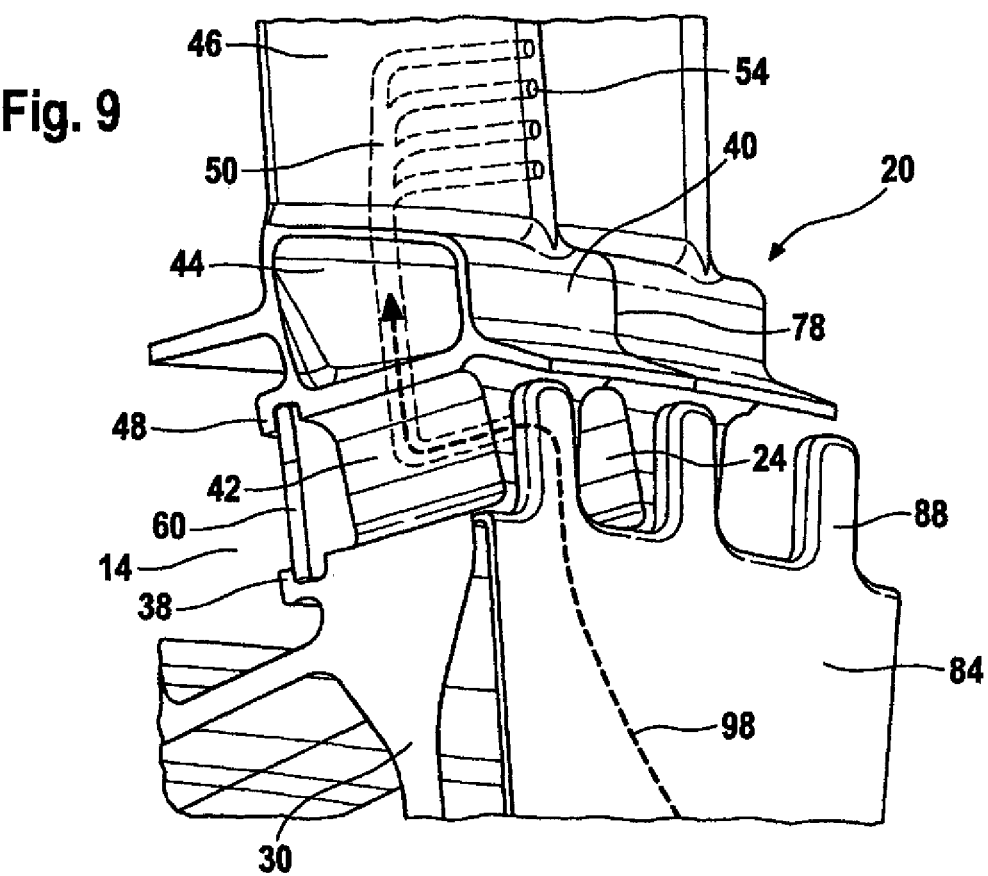
FIG. 9 a schematic representation of another integrally bladed rotor disk.

FIGS. 8, 9 and 11 each show schematically how cooling air may be supplied to the integrally bladed rotor disks which are illustrated with reference to FIG. 1 through 7. In this context, a cooling air stream is represented by an arrow 98 in each case.

FIG. 8 shows a supplying of cooling air via a cover plate 82 that is configured on high-pressure side 12 of integrally bladed rotor disk 20. Configured between disk element 30 and shafts 42 of rotor blades 40, on the one hand, as well as cover plate 82, on the other hand, is a hollow space through which cooling air is supplied which flows into cooling channels 50 of rotor blades 40 and, as the case may be, may also flow through to a lesser degree between shafts 42 to low-pressure side 14.

FIG. 9 is a schematic representation of an integrally bladed rotor disk 20 having a finger cover plate 84. Assigned to each shaft 42 of a rotor blade 40 is a finger-like radial protuberance (88) of finger cover plate 84. Between high-pressure side 12 and shafts 42, on the one hand, and finger cover plate 84, on the other hand, cooling air may flow into cooling channels 50 of rotor blades 40.

Figure 10:
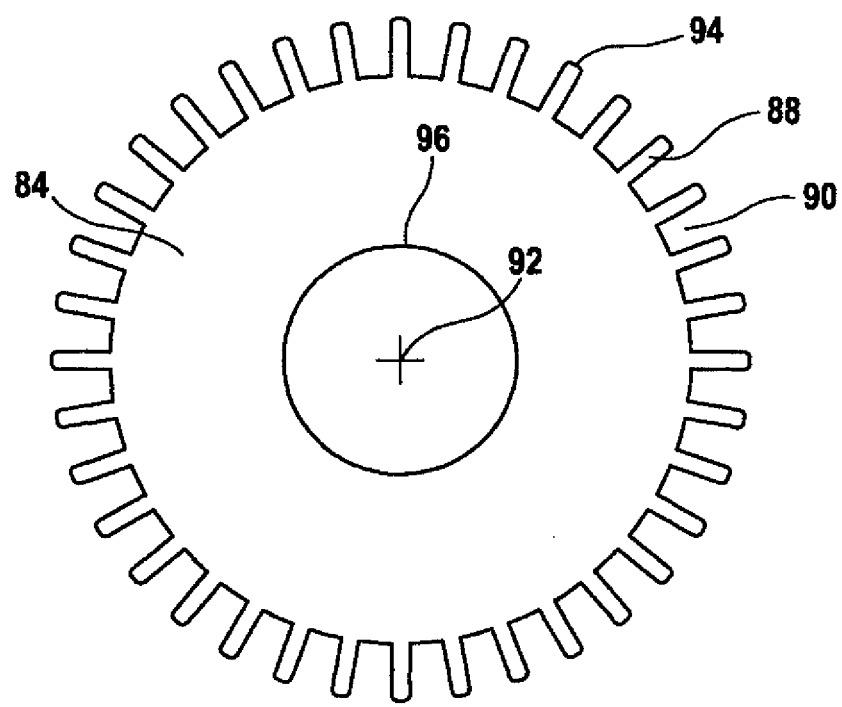
FIG. 10 a schematic representation of a finger cover plate.

FIG. 10 shows a schematic representation of finger cover plate 84 that is already shown in FIG. 9. At its outer periphery, finger cover plate 84 features finger-like radial protuberances 88. Each finger-like radial protuberance 88 extends approximately in the radial direction. Configured between two most proximate, finger-like radial protuberances 88 in each case is an interspace, respectively a radial notch 90. As a result, the distance from midpoint 92 of finger cover plate 84 to outer peripheral edge 94 thereof at finger-shaped radial protuberances 88 is greater than at radial notches 90.

Concentrically relative to midpoint 92 thereof, finger cover plate 84 may have an inner peripheral edge 96. When finger cover plate 84 is installed together with a rotor disk 20 in a turbine, inner peripheral edge 96 may encircle a shaft of the turbine.

Finger cover plate 84 and, in particular, peripheral edges 94, 96 thereof are formed in such a way that a hollow space, which is sealed at least radially outwardly, is situated between finger cover plate 84 and rotor disk 20. To this end, at least outer peripheral edge 94 of finger cover plate 84 adjoins rotor disk 20. To this end, outer peripheral edge 94 of finger cover plate 84 may be angled or edge-raised, as is discernible in FIG. 9.

At its outer peripheral edge 94, finger cover plate 84 may be welded, soldered or adhesively bonded to rotor disk 20. In the hollow space between finger cover plate 84 and rotor disk 20, cooling air may flow to shafts 42 of rotor blades 40 and into cooling channels 50 thereof. This is indicated by arrow 98.

In the example illustrated in FIG. 9, a finger-like radial protuberance 88 of finger cover plate 84 is configured on each of shafts 42 that are annularly configured on rotor disk 20. In this example as well, a radial notch 90 of finger cover plate 84 is configured at each opening 24. Deviating therefrom, it is likewise alternatively possible for a plurality of finger-like radial protuberances 88 to be configured on each shaft 42. In this case, one or a plurality of entry orifices 52 to one or a plurality of cooling channels 50 are configured underneath each finger-like protuberance 88, so that cooling air may be supplied to each entry orifice 52 via one of the finger-like radial protuberances.

FIG. 11 shows a schematic representation of an integrally bladed rotor disk 20 which may be supplied with cooling air from a pre-swirl nozzle located at the high-pressure sides thereof.

In the case of integrally bladed rotor disks 20 illustrated with reference to the figures, sealing device 60 is configured in the region of the join between disk element 30 and rotor blades 40. In place of the fastening by ribs or hooks 38, 48, both to disk element 30, as well as to rotor blades 40, as described above exemplarily with reference to FIGS. 1, 2, 6 and 9, a fastening only to disk element 30 or only to rotor blades 40 is also possible. In place of a fastening by ribs or hooks 38, 48 or additionally thereto, a fastening by a clamping, a latching, by rivets, pins, screws or in some other manner is also possible. The fastening may be designed for connection and separation processes that are carried out once only or multiple times.

As already mentioned, instead of one single cohesive component, the sealing device for sealing in the axial direction may feature a plurality of components that are not joined to one another. Therefore, the circular arc-shaped segments illustrated above with reference to FIG. 7 constitute only one, but not the only possible example. Another example provides for individual elements which are configured on or in an interspace, respectively an opening 24 in each case. These individual elements may be individually fastened to disk element 30 and/or to blades 40 employing one of the described methods. The individual elements may, for example, be fastened in the interspaces, respectively openings 24 using clamping, latching, riveting, screw or welded connections. In accordance with another alternative, a plurality or all individual elements are each fastened by a common fastening element, for example by a common clip or frame.

The invention claimed is:

1. An integrally bladed rotor disk for a turbine, comprising:
a disk element;
a plurality of rotor blades joined in a substance-to-substance bond to the disk element;
a seal for preventing or reducing an extent to which cooling air is able to flow from a high-pressure side of the rotor disk through openings on the rotor disk to a low-pressure side of the rotor disk;
the openings being annularly configured, the seal including a single- or multi-part annular component configured on the high-pressure side or on the low-pressure side of the openings; and
holding devices engaging into the openings and holding the annular component, one of the holding devices including a pipe or profiled sheet-metal component inserted into a corresponding opening and holding the annular component by a collar or a raised edge.

2. The integrally bladed rotor disk as recited in claim 1 wherein the annular component includes a sheet-metal part or a plurality of sheet-metal parts joined together.

3. The integrally bladed rotor disk as recited in claim 1 wherein the rotor disk and the rotor blades each have retaining elements holding the annular component, the annular component being hooked into the retaining elements.

4. A turbine having an integrally bladed rotor disk as recited in claim 1.

5. An integrally bladed rotor disk for a turbine, comprising:
a disk element;
a plurality of rotor blades joined in a substance-to-substance bond to the disk element; and
a finger cover plate for directing cooling air to the rotor blades, the finger cover plate having an outer periphery and having, at the outer periphery, finger-like radial protuberances and radial notches therebetween, a distance to the outer peripheral edge of the finger cover plate from a midpoint of the finger cover plate being greater at the finger-shaped radial protuberances than at the radial notches.

6. The integrally bladed rotor disk as recited in claim 1 wherein one of the rotor blades has a shaft, a blade, and a platform configured between the shaft and the blade; and the openings on the rotor disk are interspaces between the shafts of the rotor blades.

7. The integrally bladed rotor disk as recited in claim 1 wherein the seal is configured at the low-pressure side of the integrally bladed rotor disk.

8. The integrally bladed rotor disk as recited in claim 1 wherein the seal has a seal opening through which the cooling air can flow from the high-pressure side to the low-pressure side.

9. The integrally bladed rotor disk as recited in claim 1 wherein the rotor blades have a shaft, a blade and a platform between the shaft and the blade, and further comprising a plurality of additional seals configured between the platforms for preventing or reducing a flowing of cooling air between the platforms.

10. The integrally bladed rotor disk as recited in claim 5 wherein the disk has annularly configured openings between shafts of the rotor blades, a radial notch of the radial notches being configured at each opening, and at least one finger-shaped radial protuberance being configured at each shaft.

11. The integrally bladed rotor disk as recited in claim 10 further comprising a seal including a single- or multi-part annular component configured on the high-pressure side or on the low-pressure side of the openings.

12. The integrally bladed rotor disk as recited in claim 5 wherein the rotor blades have cooling channels therein, entry orifices to the cooling channels being configured at sides of the rotor blades that face a high-pressure side of the rotor disk, and/or at other sides of the rotor blades that face a low-pressure side of the rotor disk.

* * * * *